United States Patent Office 3,714,206
Patented Jan. 30, 1973

3,714,206
BENZO-2,3,1-DIAZABORINES
Heinrich Huemer, Zweifall, Siegfried Herrling, Stolberg, and Heinrich Muckter, Aachen, Germany, assignors to Chemie Gruenenthal GmbH, Stolberg im Rhineland, Germany
No Drawing. Continuation-in-part of application Ser. No. 633,390, Apr. 25, 1967. This application Dec. 2, 1968, Ser. No. 780,569
Int. Cl. A61k 27/00; C07d 107/02
U.S. Cl. 260—397.7    20 Claims

ABSTRACT OF THE DISCLOSURE

Boron containing heterocyclic compounds of the benzo-, naphtho-, or thieno-2,3,1-diazaborine type which carry in 1-position attached to the boron atom a hydroxyl group, the hydrogen atom of which may be replaced by a cation, or a benzo-, naphtho-, or thieno-2,3,1-diazaborine group, and in 2-position a sulfo group attached to a substituted or unsubstituted aromatic or heterocyclic radical. The phenylene, naphthylene, or thienylene rings therein may also be substituted. Examples are 1-hydroxy-2-(p-tolyl sulfonyl) benzo-2,3,1-diazaborine; 1-hydroxy-2-(2′,4′-dimethyl phenyl sulfonyl) benzo-2,3,1-diazaborine; 1-hydroxy - 2 - (p-amino phenyl sulfonyl) benzo - 2,3,1-diazaborine; 1-hydroxy-2-(thienyl-2′-sulfonyl) benzo-2,3,1-diazaborine; 1-hydroxy-2-(2′-chloro-4′-amino phenyl sulfonyl) benzo-2,3,1-diazaborine, and its 4′-acetamino derivative and its sodium salt; 1-hydroxy-2-[2′-chloro-4′-(β-carboxy ethylene carboxamido) phenyl sulfonyl] benzo-2,3,1-diazaborine and its sodium salt; 1-hydroxy-2-[2′-chloro-4′-(γ-carboxy propylene carboxamido) phenyl sulfonyl] benzo-2,3,1-diazaborine and its sodium salt.

The new compounds are useful antimicrobial agents and are especially effective against gram-negative bacteria, trypanosomas, and plasmodia. They possess cytostatic, antiphogistic, and other pharmacological activities. Some of them are good diuretic agents. They have a pronounced synergistic effect on antibiotics.

The compounds are prepared by condensing o-formyl phenyl boric acids, 2-formyl thienyl-(3)-boric acid, 3-formyl thienyl-(4)-boric acid, 1-formyl naphthalene-(2)-boric acid, 2-formyl naphthalene-(1)- or -(3)-boric acids, and others, or derivatives thereof with corresponding sulfonic acid hydrazides.

CROSS-REFERENCE TO RELATED APPLICATION

The present application is a continuation-in-part of pending application Ser. No. 633,390, filed Apr. 25, 1967, and now abandoned, and entitled "Boron Containing Heterocyclic Compounds and Process of Making and Using Same."

BACKGROUND OF THE INVENTION (1) Field of the invention

The present invention relates to new and valuable organic boron compounds, and more particularly to boron containing heterocyclic compounds, to compositions containing such compounds, and to a process of making and using same.

(2) Description of the prior art

Relatively few organic boron compounds have become known. Some of them, such as triphenyl boramine, propyl boric acid, phenyl boric acid, diphenyl boron chloride, and others, have been suggested as anti-oxidants in lubricants. Esters of boric acid, such as the methyl and ethyl esters, have been used as antiknock agents in motor fuels, the esters of polyvalent alcohols such as the glycol esters as electrolytes in condensers or capacitors. Boric acid esters have also been used as fluxing agent in soldering and welding, as delustering agents in cellulose and chlorinated rubber lacquers, and for extinguishing magnesium and other light metal fires. Alkyl and aryl boranes such as trialkyl and triaryl boranes have proved of value as co-catalysts in the polymerization of vinyl compounds and of other types of monomers such as epoxides, as stabilizers for polyolefins and polyurethane prepolymers. Certain boronic acids exhibit biological activity. Substituted borazines, such as amino borazines, alkenyl borazines, and halo borazines have been suggested for polymerization but no commercial use for such compounds has yet appeared.

SUMMARY OF THE INVENTION

It is one subject of the present invention to provide new and valuable heterocyclic compounds which contain boron in their heterocyclic ring system and which have a surprisingly high antimicrobial activity.

Another object of the present invention is to provide a simple and effective process of producing such new and valuable heterocyclic compounds which contain boron in their heterocyclic ring system.

Still another object of the present invention is to provide pharmaceutical compositions of high antimicrobial and other physiological activity which contain as active agent such heterocyclic compounds containing boron in their heterocyclic ring system.

A further object of the present invention is to provide a process of using such compounds in therapy as antimicrobial agents and for other purposes.

A further object of the present invention is to provide a method of synergistically affecting the action of antibiotic agents.

A further object of the present invention is to provide pharmaceutical compositions containing antibiotic agents and the organic boron compounds of the present invention.

A further object of the present invention is to provide a method of using such pharmaceutical compositions containing antibiotic agents and the organic boron compounds of the present invention in human and veterinary therapy.

Other objects of the present invention and advantageous features thereof will become apparent as the description proceeds.

In principle the new and valuable boron containing heterocyclic compounds according to the present invention are compounds of the following Formula I

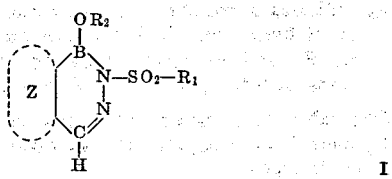

I wherein

Z is a member sharing two carbon atoms with the diazaborine ring, said member being selected from the group consisting of o-phenylene, naphthalene, thienylene, and such members substituted by a substituent selected from the group consisting of alkyl, halogen, etherified hydroxyl, etherified mercapto, alkyl sulfonyl, aralkyl sulfonyl, aryl sulfonyl, amino, acylamino, and nitro;

$R_1$ is a member selected from the group consisting of a mononuclear aromatic hydrocarbon radical, a polynuclear aromatic hydrocarbon radical, a mononuclear heterocyclic radical, a polynuclear heterocyclic radical, and such members substituted by a substituent selected from the group consisting of alkyl, etherified hydroxyl, etherified mercapto, halogen, amino, acylamino, nitro, and trifluoromethyl; and $R_2$ is a member selected from the group consisting of hydrogen, a cation, and the group

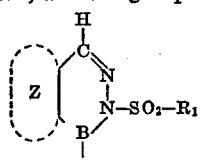

wherein Z and $R_1$ are the same members as indicated above.

When $R_1$ in Formula I indicates an aromatic hydrocarbon radical such as phenyl or naphthyl, the substituents which may be present therein are preferably attached thereto in ortho- and/or para-position to the sulfonyl (—$SO_2$) group.

When $R_1$ in Formula I represents a heterocyclic radical, said heterocyclic radical is preferably the thienyl, furyl, pyridyl, thiazolyl, thiadiazolyl, pyrimidyl, imidazolyl, or quinolyl radical which may be substituted by substituents as defined hereinabove or the sulfonyl group (—$SO_2$—) may be attached to a benzene ring sharing two carbon atoms with a heterocyclic ring system such as, for instance, the benzimidazolyl-4(7)- or -5(6)-radical, the quinazolyl-5- or -6-radical, the quinolyl-5-, -6-, -7-, or -8-radical.

When Z and/or $R_1$ contain one or more alkyl radicals, said alkyl radicals are preferably lower alkyl having 1 to 5 carbon atoms. Likewise, the alkyl radical in the alkoxy or alkyl mercapto substituents of the members Z and/or $R_1$, are preferably lower alkyl having 1 to 5 carbon atoms.

The preferred aralkyl sulfonyl or aryl sulfonyl substituents of the member Z is the benzyl sulfonyl, phenyl sulfonyl, or naphthyl sulfonyl group.

Preferred compounds of Formula I according to the present invention are those wherein $R_1$ is phenyl which may be substituted by one or two methyl or ethyl radicals, methoxy, ethoxy, methyl mercapto, or ethyl mercapto groups. Especially valuable compounds of this type are those wherein $R_1$ is the substituted phenyl ring of Formula Ia

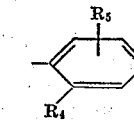

Ia

In said Formula Ia $R_3$ indicates a member selected from the group consisting of alkyl, alkoxy, alkyl mercapto, amino, and acylamino;

$R_4$ indicates a member selected from the group consisting of halogen, trifluoro methyl, and alkyl;

$R_5$ indicates a member selected from the group consisting of hydrogen, alkyl, trifluoro methyl, and halogen, and $R_4$ and $R_5$ form phenylene sharing two carbon atoms with the phenyl ring to which they are attached.

Preferably $R_3$ in such compounds is amino, or acetamino, $R_4$ methyl, fluorine, chlorine, or bromine, and $R_5$ hydrogen or halogen.

$R_2$ in the compounds of the above given Formula I is preferably hydrogen or a cation. If $R_2$ is a cation, salt-like compounds are formed which have a higher solubility than those compounds wherein $R_2$ is hydrogen.

Z in the compounds of Formula I is preferably o-phenylene or thienylene-2,3 or -3,4. Thus the preferred compounds according to the present invention are compounds of the following Formulas II, III, or IV. In said Formulas $R_1$ and $R_2$ are the same members as indicated above.

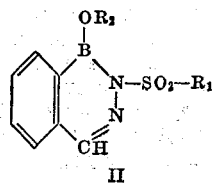

II

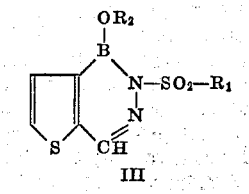

III

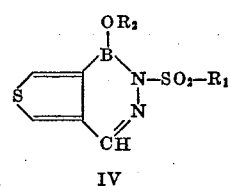

IV

The basic ring system of the compounds of Formula II is designated in the literature as "benzo-2,3,1-diazaborine." Consequently the basic ring systems of the compounds of Formulas III and IV are designated as "thieno-[2,3-e]-2,3,1-diazaborine" or, respectively, "thieno-[3,4-e]-2,3,1-diazaborine."

When Z is naphthylene, said naphthylene radical may be attached in 1,2-position or, respectively, in 2,3-position and the corresponding compounds are compounds of the following Formulas Va, Vb, or VI:

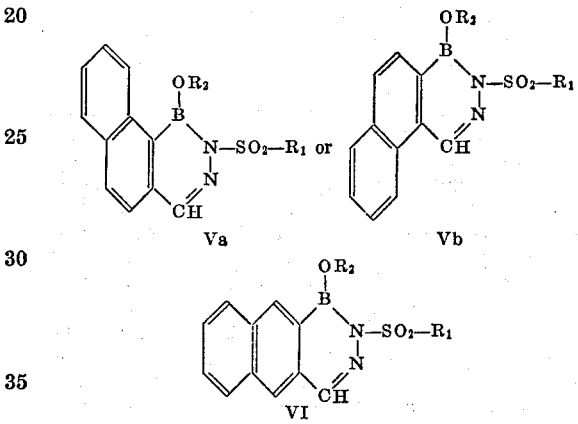

The new compounds of Formula I have a pronounced activity against microorganisms. This activity can be demonstrated not only in vitro but also in infected animals on parenteral or oral administration of said compounds according to standard test methods as they are accepted and recognized by the art as being appropriately correlated with human utility. The test results are given hereinafter in Tables II to V.

The compounds according to the present invention are not only effective against gram-negative bacteria such as *Escherichia coli, Salmonella typhimurium, Proteus vulgaris,* and others, but many of them have also a high activity against protozoas and especially against trypanosomas and plasmodia. For instance, groups of 10 mice each were infected with *Plasmodium berghei*. All animals of an untreated control group died within a period of time of 11 days to 30 days after the infection. In contrast thereto all animals lived 40 days after the infection when a daily dose of 2.5 mg./20 g. mouse of 1-hydroxy-2-(p-tolyl sulfonyl)benzo-2,3,1-diazaborine, i.e. the compound of Example 2 given hereinafter, was administered orally for 5 days. No plasmodia could be detected in blood smears of the treated animals.

In another test series mice were infected with *Trypanosoma brucei*. All animals of the untreated control group died five days after the infection. In contrast thereto 60% or, respectively, 70% of the animals which were treated for four days with an orally administered daily dose of 5 mg./20 g. mouse of 1-hydroxy-2-(p-tolyl sulfonyl) benzo-2,3,1-diazaborine or, respectively, 1-hydroxy-2-(p-methoxy phenyl sulfonyl) benzo-2,3,1-diazaborine, were still alive 14 days after the start of the experiment.

In addition thereto cytostatic properties were found in some of the compounds of Formula I and especially in those in which $R_1$ represents a heterocyclic radical which may be substituted. These properties as well as the boron content of the compounds make them especially valuable for use alone or in addition to radiation in cancer therapy. This effect is pronounced when the compounds of Formula I contain the boron isotope $B^{10}$.

Furthermore, a number of the compounds of the present invention possess antiphlogistic and other pharmacological activities. Some of them are good diuretic agents. Acute and chronic toxicity tests were also carried out with the compounds of Formula I. Tables VI and VII as given hereinafter show the results achieved in these tests.

Of course, the new compounds of Formula I may also be used for technical purposes as the known organic boron compounds.

The new compounds according to the present invention are preferably produced by reacting a compound of Formula VII

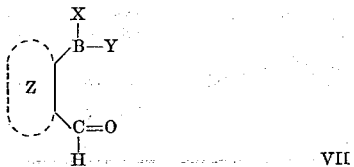

wherein

Z is the same member as indicated above and
X and Y are members, selected from the group consisting of hydroxyl, etherified hydroxyl, and halogen,
with a sulfonic acid hydrazide of Formula VIII $$H_2N-NH-SO_2-R_6 \qquad VIII$$

wherein $R_6$ indicates a member selected from the group consisting of a mononuclear aromatic hydrocarbon radical, a polynuclear aromatic hydrocarbon radical, a mononuclear heterocyclic radical, a polynuclear heterocyclic radical, and such members substituted by a substituent selected from the group consisting of alkyl, etherified hydroxyl, etherified mercapto, halogen, amino, acylamino, nitro, trifluoro methyl, and carboxamido.

If necessary and desired, the substituent $R_6$ when containing one or more carboxamido groups is subsequently converted into the substituent $R_1$ by treatment with a hypochlorite or a hypobromite, and the substituent X is subsequently converted into the member $-OR_2$.

Preferably the compound of Formula VII is reacted with the sulfonic acid hydrazide of Formula VIII in the presence of a solvent or a suspending diluent, such as an alkanol, dioxane, an aromatic hydrocarbon, for instance, benzene, if required, at elevated temperature. It is an especially advantageous procedure to remove the water and the compound Y—H formed during said reaction by azeotropic distillation with a suitable solvent such as benzene from the reaction mixture, thereby favorably affecting the progress of the reaction.

If the substituent $-OR_2$ in the resulting reaction product of Formula I is to be the hydroxyl group while X in the starting reactant of Formula VII does not represent the hydroxyl group but an etherified hydroxyl group or halogen, conversion of such a group into the hydroxyl group can readily be accomplished, for instance, by a treatment with alkaline agents such as alkali metal hydroxides, with water, or with other reagents, if required with simultaneous heating and followed by acidification.

Preferred starting compounds of Formula VII are o-formyl phenyl boric acid, 2-formyl thienyl-(3)-boric acid, 3-formyl thienyl-(4)-boric acid, 1-formyl naphthalene-(2)-boric acid, 2-formyl naphthalene-(1)- or -(3)-boric acids or derivatives thereof carrying the substituents as mentioned hereinabove with respect to the member Z.

Compounds of Formula I wherein the members Z and/or $R_1$ are substituted by one or more nitro groups can be produced according to the above described process by using reactants of Formulas VII and/or VIII which carry such nitro groups.

It is, however, also possible to first produce the nitro group-free compound of Formula I and then to introduce the nitro group or groups into the reaction product by nitration.

The nitro group or groups in said compounds can be reduced to the amino group or groups, for instance, by the action of nascent or, respectively, catalytically activated hydrogen.

Compounds of Formula I wherein Z and/or $R_1$ are substituted by one or more amino groups are also obtained by first producing compounds wherein Z and/or $R_1$ are substituted by one or more acylamino groups and then splitting off the acyl residue of such compounds in a manner known per se, for instance, by hydrolysis preferably in an acidic medium, or by hydrogenolysis of those compounds in which the acyl group is a carbobenzoxy group, an o-nitro phenoxy acetyl group, or another group which can be split off by hydrogenolysis such as by means of catalytically activated hydrogen.

Of course, other substituents of Z and/or $R_1$ as given hereinabove can be produced by conversion of suitable derivatives. Carboxamido groups, for instance, can be converted into amino groups by Hofmann rearrangement by a treatment with a hypochlorite or a hypobromite.

Furthermore, it has been found that compounds of Formula I and especially the preferred members of said group of compounds are capable of increasing the antibacterial activity of antibiotic agents or, vice versa, that antibiotic agents increase the activity of the compounds of Formula I. Thus the antibiotic agents and the compounds according to the present invention exert a highly unexpected synergistic effect upon their antibacterial activity. This favorable effect of the compounds of Formula I upon the antibacterial effectiveness of 6-acylamino penicillanic acids, i.e. the "penicillins," tetracyclines, chloramphenicol, spiramycin, kanamycin, streptomycin, dihydrostreptomycin, colistin, and other antibiotic agents has been proved. See hereinafter Tables VIII and IX wherein test results are given for 1-hydroxy-2-(2'-chloro-4'-amino phenyl sulfonyl) benzo-2,3,1-diazaborine. Similar synergistic effects are produced by a combination of the antibiotic agent, for instance, with 1-hydroxy-2-(2'-chloro-4'-acetamino phenyl sulfonyl) benzo-2,3,1-diazaborine,
1-hydroxy-2-(p-tolyl sulfonyl) benzo-2,3,1-diazaborine,
1-hydroxy-2-(2'-chloro-4'-acetamino phenyl sulfonyl) thieno[2,3-e]-2,3-diazaborine,
1-hydroxy-2-(2'methyl-4'-amino phenyl sulfonyl) benzo-2,3,1-diazaborine,
1-hydroxy-2-(2'-trifluoro methyl-4'-amino phenyl sulfonyl) benzo-2,3,1-diazaborine,
1-hydroxy-2-(2'-chloro-4'-amino phenyl sulfonyl)-7-methyl or
-7-methoxy benzo-2,3,1-diazaborine, and others.

As mentioned hereinabove, the compounds of Formula I wherein $R_2$ is hydrogen, form salts with basic agents. Thus the present invention also comprises salts of the compounds of Formula I with basic antibiotic compounds such as with streptomycin, dihydrostreptomycin, kanamycin, spiramycin, and others.

Such salts are produced in a manner known per se by reacting an acid addition salt of the basic antibiotic compound such as its hydrochloride, with a compound of Formula I wherein $R_2$ is a cation such as sodium or silver, in the presence of a solvent.

It is also possible to produce such salts by dissolving a compound of Formula I wherein $R_2$ is hydrogen, in a solution of the free base of the antibiotic compound. The resulting solution of the salt of an antibiotic base and a 1-hydroxy compound of Formula I can be used directly in therapy or the respective salt may be isolated therefrom, for instance, by lyophilization.

For instance, streptomycin or dihydrostreptomycin may form salts with up to three moles of a compound of Formula I. However, salts of sufficiently increased antibacterial activity are obtained in most instances if only one or two of the basic groups of the antibiotic compound are converted into salts of the compounds of Formula I. If desired, the remaining free basic groups of the antibiotic compounds may be reacted with other acids, such as pantothenic acid, sulfuric acid, and others to form the respective salts.

The products according to the present invention, i.e. mixtures of the compounds of Formula I with antibiotic compounds and/or salt-like compounds of these components, are superior to the individual components with respect to their antibacterial activity. This superiority is due, as stated above, to the surprising synergistic effect which the components exert upon each other. They can be used in therapy in the same manner as the single components, i.e. they can be administered orally, rectally, parenterally, or even topically.

Suitable pharmaceutical compositions are prepared by incorporating the above mentioned mixtures or salts into tablets, capsules, sirups, solutions, suspensions, suppositories, globuli, ointments, creams, powders, and others. Stabilization of such preparations is carried out in a known manner and is dependent on the antibiotic compound used because usually the compounds of Formula I are more stable than the antibiotic compounds.

DESCRIPTION OF THE PREFERRED EMBODIMENTS

The following examples serve to illustrate the present invention without, however, limiting the same thereto. All temperature data given in said examples are uncorrected.

EXAMPLE 1

A solution of 3.44 g. of benzene sulfonic acid hydrazide in 20 cc. of hot ethanol is mixed with a solution of 3.0 g. of o-formyl phenyl boric acid in 15 cm. of hot ethanol. The reaction mixture is boiled under reflux for several minutes. Crystals precipitate on cooling. They are filtered off and recrystallized from ethanol. 1-hydroxy-2-phenyl sulfonyl benzo-2,3,1-diazaborine melting at 163–165° C. is obtained in a yield of 4.2 g. corresponding to 73% of the theoretical yield.

EXAMPLE 2

The procedure is the same as described in Example 1 whereby, however, 15 g. of o-formyl phenyl boric acid dissolved in 50 cc. of hot ethanol and 18.6 g. of p-toluene sulfonic acid hydrazide dissolved in 200 cc. of hot ethanol are employed as reactants. 1-hydroxy-2-(p-tolyl sulfonyl) benzo-2,3,1-diazaborine is obtained in a yield of 28.5 g. corresponding to 95% of the theoretical yield. Melting point: 155–157° C. on recrystallization from a mixture of ethanol and toluene (1:1).

EXAMPLES 3 TO 17

When using o-formyl phenyl boric acid and the corresponding sulfonic acid hydrazides and otherwise proceeding as described in Example 2, the following 1-hydroxy benzo-2,3,1-diazaborines substituted in 2-position by the groups listed in the following Table I are obtained:

TABLE I

| Example No. | Substituent in 2-position | Melting point, °C. | Yield, percent | Recrystallized from— |
|---|---|---|---|---|
| 3 | p-Fluoro phenyl sulfonyl | 173–175 | 85 | Ethanol/benzene (1:1). |
| 4 | p-Chloro phenyl sulfonyl | 171–173 | 92 | Do. |
| 5 | 2',4',6'-trimethyl phenyl sulfonyl | 153–155 | 82 | Ethanol. |
| 6 | Thienyl-2'-sulfonyl | 203–206 | 49 | Toluene. |
| 7 | p-Ethyl phenyl sulfonyl | 97–99 | 56 | Ethanol. |
| 8 | m-Nitro phenyl sulfonyl | 201–204 | 66 | Toluene. |
| 9 | 2',4'-dimethyl phenyl sulfonyl | 152–154 | 79 | Do. |
| 10 | p-Ethyl mercapto phenyl sulfonyl | 129–131 | 71 | Ethanol/benzene (2:1). |
| 11 | o-Tolyl sulfonyl | 136–138 | 65 | Ethanol/toluene (1:1). |
| 12 | 2',5'-dimethyl thienyl-3'-sulfonyl | 142–143 | 74 | Ethanol/benzene (5:1). |
| 13 | Pyridyl-3'-sulfonyl | 185–188 | 35 | Ethanol/dimethyl formamide (4:1). |
| 14 | 2',5'-dimethyl furyl-3'-sulfonyl | 128–129 | 55 | Ethanol/benzene (4:1). |
| 15 | 1'-methyl-5'-chloro imidazolyl-4'-sulfonyl | ¹ 220–225 | 76 | Dimethyl formamide/water (2:1). |
| 16 | Pyridyl-4'-sulfonyl | ¹ 181–182 | 48 | Ethanol/dimethyl formamide (1:1). |
| 17 | 3'-methyl isothiazolyl-4'-sulfonyl | 181–183 | 71 | Toluene. |

¹ Decomposed.

EXAMPLE 18

16.5 g. of o-formyl phenyl boric acid are dissolved in 70 cc. of hot ethanol. A hot solution of 24.7 g. of p-acetamino benzene sulfonic acid hydrazide in 400 cc. of 50% ethanol is added thereto. The reaction mixture is heated to boiling and is then allowed to cool. The resulting crystals are recrystallized from a mixture of ethanol and dimethyl formamide (1:1). 28 g. of 1-hydroxy-2-(p-acetamino phenyl sulfonyl) benzo-2,3,1-diazaborine are obtained. Melting point: 234–236° C. with decomposition. Yield: 62% of the theoretical yield.

EXAMPLE 19

A hot solution of 3 g. of o-formyl phenyl boric acid in 10 cc. of ethanol is added to a hot suspension of 3.4 g. of p-methoxy benzene sulfonic acid hydrazide in 20 cc. of ethanol while stirring. Boiling of the reaction mixture yields a clear solution after a short period of time. On cooling, 1-hydroxy-2-(p-methoxy phenyl sulfonyl) benzo-2,3,1-diazaborine crystallizes from said solution. Said compound melts at 140–141° C. on recrystallization from a mixture of ethanol and toluene (1:1). Yield 4.2 g. corresponding to 67% of the theoretical yield.

EXAMPLE 20

A mixture of 11.7 g. of o-formyl phenyl boric acid, 18 g. of benzothiazole-2-sulfonic acid hydrazide, and 150 cc. of ethanol is boiled under reflux. Initially a clear solution is obtained. On continued heating, precipitation of 1-hydroxy-2-(benzothiazolyl-2'-sulfonyl) benzo-2,3,1-diazaborine takes place. Melting point: 161–162° C. on recrystallization from a mixture of ethanol and benzene (2:1). Yield. 21 g. corresponding to 78% of the theoretical yield.

EXAMPLE 21

The procedure is the same as described in Example 20 whereby, however, 10.2 g. of 2-formyl thienyl-3-boric acid, 12.1 g. of p-toluene sulfonic acid hydrazide, and 100 cc. of ethanol are used in the reaction. 1-hydroxy-2-(p-tolyl sulfonyl) thieno-[2,3-e]-2,3-diazaborine of the melting point 175–177° C. is obtained. Yield: 17 g. corresponding to 86% of the theoretical yield.

EXAMPLE 22

21.8 g. of p-methyl mercapto benzene sulfonic acid hydrazide and 15 g. of o-formyl phenyl boric acid are mixed and then dissolved in 150 cc. of hot ethanol. The clear solution is boiled for a short period of time. Thereafter crystals precipitate. They are filtered off by suction after cooling the reaction mixture and are recrystallized from a mixture of ethanol and benzene (2:1). 1-hydroxy- 2-(p-methyl mercapto phenyl sulfonyl) benzo-2,3-,1-diazaborine melting at 128–130° C. is obtained. Yield: 27 g. corresponding to 81% of the theoretical yield.

EXAMPLE 23

The procedure is the same as described in Example 22 whereby, however, 9.9 g. of 2-formyl thienyl-(3)-boric acid, 13.8 g. of p-methyl mercapto benzene sulfonic acid hydrazide, and 70 cc. of ethanol are used in the reaction. The resulting 1-hydroxy-2-(p-methyl mercapto phenyl sulfonyl) thieno-[2,3-e]-2,3,1-diazaborine melts at 163–165° C. on recrystallization from ethanol and benzene (1:1). Yield. 14.4 g. corresponding to 67% of the theoretical yield.

EXAMPLE 24

70 cc. of hot ethanol are added to a mixture of 4.5 g. of 2-formyl-5-methyl phenyl boric acid and 5.1 g. of p-toluene sulfonic acid hydrazide. The reaction mixture is boiled under reflux for 10 minutes. Initially a clear solution is obtained. Crystals precipitates therefrom during heating. The reaction mixture is cooled to complete precipitation of the crystals. After filtration and recrystallization from a mixture of ethanol and benzene (1:1), 1-hydroxy-2-(p-tolyl sulfonyl)-7-methyl benzo-2,3,1-diazaborine is obtained in a yield of 6.8 g. corresponding to 79% of the theoretical yield. Melting point: 163–165° C.

EXAMPLE 25

28 g. of the reaction product obtained according to Example 18 are heated on the water bath in 300 cc. of concentrated hydrochloric acid while stirring. After some time a clear solution is obtained. Said solution is diluted with 300 cc. of water. The pH-value of the diluted solution is adjusted to a pH between 3.0 and 4.0 by the addition of 30% aqueous sodium hydroxide solution. After cooling, the reaction mixture is filtered and the filter residue is recrystallized from a mixture of ethanol and dimethyl formamide. 1-hydroxy-2-(p-amino phenyl sulfonyl) benzo-2,3,1-diazaborine of the melting point 179° C. is obtained. Yield: 21 g. corresponding to 75% of the theoretical yield.

EXAMPLE 26

To a mixture of 149.8 g. of formyl phenyl boric acid and 265.6 g. of 2-chloro-4-acetamino benzene sulfonic acid hydrazide there are added, while stirring, 1000 cc. of dimethyl formamide heated to 30° C. After stirring for 30 minutes, 1000 cc. of hot water are slowly added to the solution. The mixture is cooled and filtered. The residue is washed with methanol, dried, and dissolved in 900 cc. of hot dimethyl formamide. 400 cc. of hot water are added to this solution. After the mixture has been cooled, it is filtered. 1-hydroxy-2-(2'-chloro-4'-acetamino phenyl sulfonyl) benzo-2,3,1-diazaborine is obtained in a yield of 300 g. (75% of the theoretical yield). Melting point: 253–254° C. (with decomposition).

EXAMPLE 27

200 g. of the compound obtained according to Example 26 are suspended in 2.3 liters of methanol, 800 cc. of concentrated hydrochloric acid are added, and the mixture is refluxed, while stirring vigorously. After boiling for 30 to 35 minutes, the mixture is cooled in an ice bath and filtered. The residue is washed with methanol, dried and dissolved in 500 cc. of hot dimethyl formamide. 300 cc. of hot water are added to this solution, while stirring. After cooling, the mixture is filtered. The residue is washed with methanol and dried in a vacuum. 150 g. (84% of the theoretical yield) of 1-hydroxy-2-(2'-chloro-4'-amino phenyl sulfonyl) benzo-2,3,1-diazaborine are obtained. Melting point: 256–258° C. (with decomposition).

EXAMPLE 28

A mixture of 4.8 g. of 2-methyl-4-acetamino benzene sulfonic acid hydrazide of the melting point: 152–153° C. (with decomposition), 3.3 g. of o-formyl phenyl boric acid, and 10 cc. of dimethyl formamide is heated until a clear solution is obtained, which is heated for another ten minutes. 50 cc. of hot water are slowly added thereto, while stirring. The resulting mixture is cooled and filtered. The filtered residue is washed first with water and then with methanol and is finally dried. 1-hydroxy-2-(2'-methyl-4'-acetamino phenyl sulfonyl) benzo-2,3,1-diazaborine is obtained in a yield of 4 g. (53% of the theoretical yield). Melting point: 196–198° C.

EXAMPLE 29

50 g. of the compound prepared according to Example 28 are boiled with a mixture of 600 cc. of methanol and 200 cc. of concentrated hydrochloric acid for 20 minutes. The resulting solution is diluted by the addition of 1.5 liter of hot water and is cooled and stored for some hours. The precipitate is filtered off, washed with water and methanol, and then dried. 23 g. (52% of the theoretical yield) of 1-hydroxy-2-(2'-methyl-4'-amino phenyl sulfonyl) benzo-2,3,1-diazaborine are obtained. Melting point: 187–188° C.

EXAMPLE 30

2.7 g. of 2-trifluoro methyl-4-nitro benzene sulfonic acid hydrazide of the melting point: 103–104° C. (with decomposition) are dissolved in 5 cc. of dimethyl formamide together with 2 g. of o-formyl phenyl boric acid. After 10 minutes 30 cc. of hot water are slowly added to the stirred solution. After cooling, the mixture is filtered, the residue is washed with water, dissolved in 10 cc. of dimethyl formamide, and reprecipitated by the addition of 60 cc. of water. 1.6 g. (40% of the theoretical yield) of 1-hydroxy-2-(2'-trifluoro methyl-4'-nitro phenyl sulfonyl) benzo-2,3,1-diazaborine melting at 159–160° C. are obtained.

EXAMPLE 31

18 g. of the compound prepared according to Example 30 are dissolved in 150 cc. of glacial acetic acid. The solution is heated to 50–60° C. While stirring vigorously, 10 g. of iron powder are added thereto, thereby causing the temperature to increase to 70–80° C. The reaction mixture is kept at said temperature for 45 minutes. After the addition of 200 cc. of water, the mixture is cooled and then filtered. The residue is washed with water, treated with 35 cc. of dimethyl formamide, and filtered. The filtrate is diluted by slowly adding 70 cc. of hot water thereto and is then cooled. The preicpitate is isolated by filtration, washed with water, and dried. 1-hydroxy-2-(2'-trifluoro methyl-4'-amino phenyl sulfonyl) benzo-2,3,1-diazaborine is obtained in a yield of 10 g. (60% of theoretical yield). Melting point: 244–246° C. (with decomposition).

EXAMPLE 32

8 g. og 2-formyl-5-methyl phenyl boric acid of the melting point: 148° C. (with decomposition), prepared from 2-bromo-4-methyl benzaldehyde, and 12 g. of 2-chloro-4-nitro benzene sulfonic acid hydrazide of the melting point 135–137° C. (with decomposition) are dissolved in 100 cc. of dimethyl formamide. The solution is heated to 70–80° C. 15 cc. of water are slowly added to said solution. After cooling, the mixture is filtered and the residue is washed with water and dried. 15 g. (83.5% of the theoretical yield) of 1-hydroxy-2-(2'-chloro-4'-nitro phenyl sulfonyl)-7-methyl benzo-2,3,1-diazaborine melting at 209–211° C. are obtained.

EXAMPLE 33

15 g. of the compound obtained according to Example 32 are dissolved in 400 cc. of glacial acetic acid, heated to 100° C. 10 g. of iron powder are added thereto in portions within 30 minutes, while stirring and maintaining the temperature at 90–100° C. 100 cc. of boiling water are added thereto after 45 minutes. The mixture is cooled and filtered. The residue is treated with dimethyl sulfoxide (75 cc.) and activated charcoal, and is filtered. 50 cc. of hot water are added to the filtrate. After cooling the mixture, it is filtered and the residue is washed with water and dried in a vacuum. 11 g. (79.6% of the theoretical yield) of 1-hydroxy-2-(2'-chloro-4'-amino phenyl sulfonyl)-7-methyl benzo-2,3,1-diazaborine are obtained. Melting point: 260–262° C. (with decomposition).

EXAMPLE 34

7.5 g. of o-formyl phenyl boric acid and 10 g. of 2-chloro-4-nitro benzene sulfonic acid hydrazide are dissolved in 50 cc. of dimethylformamide. Activated charcoal is added thereto after ten minutes. The mixture is filtered. 40 cc. of hot water are slowly added to the filtrate while stirring. After cooling, the mixture is filtered. The residue is dissolved in 50 cc. of dimethylformamide and reprecipitated by the addition of 40 cc. of hot water. 12 g. (82% of the theoretical yield) of 1-hydroxy-2-(2'-chloro-4'-nitro phenyl sulfonyl) benzo-2,3,1 diazaborine melting at 210–212° C. are obtained on filtration.

On reducing this compound in the same manner as described in Example 33 the same compound as described in Example 27 is obtained.

EXAMPLE 35

3 g. of 2-formyl-5-methoxy phenyl boric acid of the melting point: 165–168° C. (with decomposition), prepared from 2-bromo-4-methoxy benzaldehyde, and 3.8 g. of 2-chloro-4-nitro benzene sulfonic acid hydrazide are dissolved in 20 cc. of dimethyl sulfoxide. The mixture is stirred and, after 10 minutes, 20 cc. of hot water are slowly added thereto. After cooling, the mixture is filtered. The residue is washed with water and dried. 4 g. (67% of the theoretical yield) of 1-hydroxy-2-(2'-chloro-4'-nitro phenyl sulfonyl)-7-methoxy benzo-2,3,1-diazaborine melting at 199–201° C. are obtained.

EXAMPLE 36

4 g. of the compound obtained according to Example 35 are dissolved in 100 cc. of glacial acetic acid heated to 100° C. At this time temperature 4 g. of iron powder are added thereto in portions within 20 minutes while stirring vigorously. After 10 more minutes 100 g. of ice are added. The mixture is filtered and the residue is treated with 40 cc. of dimethyl sulfoxide. Thereafter the resulting mixture is filtered and 40 cc. of hot water are added to the filtrate. After cooling, the mixture is filtered. The residue is washed with water and dried. 2.3 g. (62% of the theoretical yield) of 1-hydroxy-2-(2'-chloro-4'-amino phenyl sulfonyl)-7-methoxy benzo-2,3,1-diazaborine are obtained. Melting point: 258–261° C. (with decomposition).

EXAMPLE 37

6 g. of 2-formyl thienyl-3-boric acid and 10 g. of 2-chloro-4-acetamino benzene sulfonic acid hydrazide are dissolved in 60 cc. of dimethylformamide. The solution is stirred and, after 15 minutes, 300 cc. of hot water are added slowly thereto. The mixture is allowed to cool and is stored at room temperature for some time. The precipitate is filtered off, washed with water, and dried. The resulting product is treated with diemthylformamide (30 cc.) and activated charcoal. The mixture is filtered and the reaction product is reprecipitated from the filtrate by the addition of 150 cc. of hot water. This purification procedure is repeated, whereupon 1-hydroxy-2-(2'-chloro-4'-acetamino phenyl sulfonyl) thieno-[2,3-e]-2,3,1-diazaborine melting at 239–241° C. (with decomposition) is obtained in a yield of 5 g. (35% of the theoretical yield).

EXAMPLE 38

4 g. of the compound obtained according to Example 30 are dissolved in 75 cc. of dimethylformamide and are hydrogenated at atmospheric pressure in the presence of Raney nickel catalyst at 40° C. The catalyst is filtered off and the filtrate is concentrated to a volume of about 30 cc. 70 cc. of water are added thereto. The resulting precipiate is filtered off, washed with water, and dried. The same compound is obtained as in Example 31 in a yield of 3.2 g. (86.8% of the theoretical yield).

EXAMPLE 39

4 g. of the compound obtained according to Example 30 are dissolved in 300 cc. of glacial acetic acid and are hydrogenated at 40° C. and under atmospheric pressure in the presence of 5% palladium deposited on carbon. The catalyst is filtered off and the filtrate is evaporated to dryness. The residue is dissolved in 25 cc. of dimethylformamide. 75 cc. of water are added to said solution. The same compound is obtained as in Examples 31 and 38 in a yield of 3.3 g. (89.5% of the theoretical yield).

EXAMPLE 40

By using o-formyl phenyl boric acid and 2,5-dichloro-4-acetamino phenyl sulfonyl hydrazide as reactants and otherwise proceeding as described in Example 2, there is obtained 1-hydroxy-2-(2',5'-dichloro-4'-acetamino phenyl sulfonyl) benzo-2,3,1-diazaborine in a yield of 54% of the theoretical yield. Melting point: 233–235° C. on recrystallization from a mixture of dimethylformamide and water (1:1).

EXAMPLE 41

By using o-formyl phenyl boric acid and 5-N-acetyl-N-methylamino-1,3,4-thiadiazolyl sulfonyl hydrazide as reactants and otherwise proceeding as described in Example 2, there is obtained 1-hydroxy-2-[5'-(N-acetyl-N-methylamino) - 1,3,4 - thiadiazolyl - 2' - sulfonyl]benzo-2,3,1-diazaborine of the formula

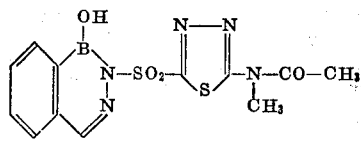

Melting point: 188–189° C. (with decomposition) on recrystallization from a mixture of dimethylformamide and water (1:1). Yield: 62% of the theoretical yield.

EXAMPLE 42

400 cc. of hot methanol are added to a mixture of 74 g. of 5-acetamido pyridine-2-sulfonic acid hydrazide and 50 g. of o-formyl phenyl boric acid, while stirring. A clear solution is obtained. 96 g. of 1-hydroxy-2-(5'-acetamido pyridyl sulfonyl - 2') - benzo-2,3,1-diazaborine crystallize from said solution after standing for some time. This compound is dissolved in 500 cc. of hot dimethylformamide. The solution is treated with activated charcoal and filtered. The purified compound is precipitated from the filtrate by the addition of hot water. 86 g. of the pure compound are obtained. Melting point: 231–232° C. (with decomposition). The yield is 78% of the theoretical yield.

EXAMPLE 43

30 g. of the compound produced according to Example 42 are heated to boiling with a mixture of 360 cc. of methanol and 150 cc. of concentrated hydrochloric acid while stirring vigorously. A clear solution is obtained after ten minutes. On further heating, a precipitate is obtained therefrom. The mixture is cooled, diluted with water, and filtered. The residue is dried, dissolved in 100 cc. of dimethylformamide, and reprecipitated from the resulting solution by the addition of hot water. 16 g. of 1-hydroxy-2-(5'-amino pyridyl sulfonyl-2')-benzo-2,3,1-diazaborine melting at 221–223° C. (with decomposition) are obtained. Yield: 61% of the theoretical yield.

EXAMPLE 44

73 g. of 4-acetamido naphthalene-1-sulfonic acid hydrazide and 60 g. of o-formyl phenyl boric acid are mixed and then treated with 800 cc. of hot ethanol. Boiling of the reaction mixture yields a clear solution after a short period of time. Said solution is treated with activated charcoal and filtered, while hot. The residue is washed with 200 cc. of hot ethanol. The combined filtrates are heated to boiling and then diluted with 300 cc. of hot water, while stirring. The mixture is allowed to cool, then it is filtered. 52 g. of 1-hydroxy-2-(4'-acetamido-naphthyl-1'-sulfonyl)-benzo-2,3,1 - diazaborine are obtained. Melting point: 213–214° C. with decomposition. Yield: 51% of the theoretical yield.

EXAMPLE 45

By using 60 g. of o-formyl phenyl boric acid and 42 g. of 2-fluoro-4-nitro benzene sulfonic acid hydrazide in 200 cc. of dimethylformamide as reactants and otherwise proceeding as described in Example 26, there are obtained 57 g. of 1-hydroxy-2(2'-fluoro-4'-nitro phenyl sulfonyl) benzo-2,3,1-diazaborine of the melting point: 220–223° C. (with decomposition). Yield: 92% of the theoretical yield.

EXAMPLE 46

By reducing 57 g. of 1-hydroxy-2-(2'-fluoro-4'-nitro phenyl sulfonyl) benzo-2,3,1-diazaborine obtained according to Example 45 in 1000 cc. of glacial acetic acid with 70 g. of iron powder, purifying the reaction product by water precipitation from its dimethylformamide solution, and otherwise proceeding as described in Example 33, 34 g. of 1-hydroxy-2-(2'-fluoro-4'-amino phenyl sulfonyl) benzo-2,3,1-diazaborine of the melting point: 220–223° C. (with decomposition) are obtained. Yield: 65% of the theoretical yield.

EXAMPLE 47

By using 150 g. of 2-bromo-4-acetamido benzene sulfonic acid hydrazide and 100 g. of o-formyl phenyl boric acid as reactants in 1,500 cc. of hot ethanol and otherwise proceeding as described in Example 1 whereby purification of the reaction product is effected by water-precipitation from its dimethylformamide solution, there is obtained 1-hydroxy-2-(2'-bromo-4'-acetamino phenyl sulfonyl) benzo-2,3,1-diazaborine of the melting point: 238–240° C. (with decomposition). Yield: 57% of the theoretical yield.

EXAMPLE 48

By de-acetylating 25 g. of 1-hydroxy-2-(2'-bromo-4'-acetamino phenyl sulfonyl) benzo-2,3,1-diazaborine obtained according to Example 47, by means of 400 cc. of an 8.5% solution of hydrogen chloride in absolute methanol and otherwise proceeding as described in Example 29, there is obtained 1-hydroxy-2-(2'-bromo-4'-amino phenyl sulfonyl) benzo-2,3,1-diazaborine which melts at 255–257° C. (with decomposition) on recrystallization by means of dimethylformamide and water. Yield: 50% of the theoretical yield.

EXAMPLE 49

By de-acetylating 52 g. of 1-hydroxy-2-(2',5'-dichloro-4'-acetamino phenyl sulfonyl) benzo-2,3,1-diazaborine obtained according to Example 40, by means of 1400 cc. of a 5% solution of hydrogen chloride in methanol and otherwise proceeding as described in Example 29, there are obtained 29 g. of 1-hydroxy-2-(2',5'-dichloro-4'-amino phenyl sulfonyl) benzo-2,3,1-diazaborine melting at 221–222° C. (with decomposition). Yield: 62% of the theoretical yield.

EXAMPLE 50

104 g. of 1-hydroxy-2-(2'-chloro-4'-amino phenyl sulfonyl) benzo 2,3,1-diazaborine obtained according to Example 27, and 38 g. of succinic acid anhydride are dissolved in 600 cc. of dry pyridine. The solution is heated on the water bath for three hours. The reaction mixture is allowed to stand overnight, whereafter water is added. 1-hydroxy - 2 - [2'-chloro-4'-($\beta$-carboxy ethylene carboxamido) phenyl sulfonyl]benzo-2,3,1-diazaborine precipitates. It is recrystallized three times from isopropanol. The pure compound melts at 210–212° C. (with decomposition). Yield: 72 g. corresponding to 53% of the theoretical yield.

EXAMPLE 51

70 g. of 1-hydroxy-2-(2'-chloro-4'-amino phenyl sulfonyl) benzo-2,3,1-diazaborine obtained according to Example 27, and 50 g. of glutaric acid anhydride are dissolved in 500 cc. of hot pyridine. The solution is heated on the water bath for 3 hours whereafter the pyridine is distilled off in a vacuum at as low a temperature as possible. The remaining very viscous oil is dissolved in 300 cc. of dimethylformamide. 300 cc. of ethanol are added to said solution which is then heated. Water is added thereto to precipitate 1-hydroxy-2-[2'-chloro-4'-($\gamma$-carboxy propylene carboxamido) phenyl sulfonyl] benzo-2,3,1-diazaborine in crystalline form. The crude reaction product is dissolved in 100 cc. of dimethylformamide, 400 cc. of methanol are added, and the mixture is heated to boiling. Crystallization is then initiated by the addition of 430 cc. of water. Thereby, 46 g. of the pure compound melting at 209–210° C. (with decomposition) are obtained. Yield: 49% of the theoretical yield.

EXAMPLE 52

57.7 g. of 1-hydroxy-2-(2'-chloro-4'-amino phenyl sulfonyl) benzo-2,3,1-diazaborine obtained according to Example 27, and 32.6 g. of phthalic acid anhydride are dissolved in 500 cc. of absolute pyridine. The solution is heated in the water bath for one hour whereafter the pyridine is distilled off in a vacuum at as low a temperature as possible. The remaining residue is dissolved in 250 cc. of dimethylformamide. 100 cc. of ethanol are added. The mixture is heated to boiling. 1-hydroxy-2-[2'-chloro-4'-(o-carboxy benzamido) phenyl sulfonyl]benzo-2,3,1-diazaborine is precipitated therefrom by the addition of water. This crude product is twice treated in the same manner as described above with dimethylformamide, ethanol, and water. Thereby, 48 g. of the pure compound melting at 212–215° C. (with decomposition) are obtained. Yield: 58% of the theoretical yield.

EXAMPLE 53

1000 cc. of absolute pyridine are added to 150 g. of $\alpha$-phthalimido glutaric acid anhydride and 134 g. of 1-hydroxy-2-(2'-chloro-4'-amino phenyl sulfonyl) benzo-2,3,1-diazaborine obtained according to Example 27. The mixture is heated on the water bath while stirring vigorously. The resulting clear solution is heated for two more hours, whereafter the pyridine is distilled off in a vacuum. The residue is dissolved in a mixture of 350 cc. of dimethylformamide and 150 cc. of ethanol. The solution is heated to boiling and water is added thereto to precipitate 1 - hydroxy-2-[2'-chloro-4'-($\gamma$-phthalimido-$\gamma$-carboxy propylene carboxamido) phenyl sulfonyl] benzo-2,3,1-diazaborine. The crude reaction product is purified by repeatedly dissolving it in a mixture of dimethylformamide and isopropanol and precipitating it therefrom by the addition of water. 96 g. of the pure compound melting at 274–275° C. (with decomposition) are obtained. The yield is 40% of the theoretical yield.

EXAMPLE 54

250 cc. of absolute pyridine are added to 33.6 g. of 1-hydroxy - 2-(2'-chloro-4'-amino phenyl sulfonyl) benzo-2,3,1-diazaborine obtained according to Example 27. 40 cc. of chloro formic acid ethyl ester are added drop by drop thereto while stirring vigorously. Thereafter, the reaction mixture is heated under reflux to boiling for one hour and is diluted with water. After cooling the mixture, the precipitate is filtered off and recrystallized from ethanol. 27 g. of 1-hydroxy-2-(2′-chloro-4′-carbethoxy amino phenyl sulfonyl) benzo-2,3,1-diazaborine of the melting point: 176–178° C. are obtained. Yield: 66% of the theoretical yield.

EXAMPLE 55

40 g. of p-ureido phenyl sulfonic acid hydrazide of the melting point: 160–163° C. (with decomposition) and 40 g. of o-formyl phenyl boric acid are dissolved in 800 cc. of hot ethanol. Hot water is added to the reaction mixture after 20 minutes. After cooling the mixture, the resulting precipitate is filtered off. The crude reaction product is repeatedly recrystallized from ethanol. 20 g. of 1-hydroxy-2-(4′-ureido phenyl sulfonyl) benzo-2,3,1-diazaborine melting at 202–204° C. (with decomposition) are obtained. Yield: 33% of the theoretical yield.

EXAMPLE 56

15.1 g. of 1 - hydroxy - 2-(p-amino phenyl sulfonyl) benzo-2,3,1-diazaborine obtained according to Example 25, are dissolved at room temperature in 120 cc. of absolute pyridine. 20 cc. of chloro formic acid phenyl ester are added drop by drop thereto while stirring. After the exothermic reaction has ceased, the reaction mixture is heated on the water bath for one more hour, cooled, and diluted with water. The precipitating oil crystallizes slowly. The crystalline product is washed with water and dried. 22 g. of a compound melting at 171–176° C. (with decomposition) are obtained. It is comminuted and added in small portions to 50 cc. of ice-cooled n-butylamine, while stirring, whereby the temperature is kept at 10° C. Stirring at 10° C. is continued for one hour, whereafter excess n-butylamine is distilled off in a vacuum. The residue is dissolved in ethanol and acidified with dilute hydrochloric acid. The precipitating crystals are purified by dissolving them in a mixture of equal parts of dimethylformamide and ethanol and reprecipitating them by the addition of water. 4.1 g. of 1-hydroxy-2-[p-(n-butyl ureido) phenyl sulfonyl]benzo-2,3,1-diazaborine melting at 177–179° C. (with decomposition) are obtained in this manner.

Due to the hydroxyl group being attached to the boron atom of the new compounds they are able to form salts with cations. When using, for instance, dilute sodium or potassium hydroxide solutions, such as N or 2 N solutions, ammonia solutions, preferably 5% solutions, or aqueous solutions of organic amino compounds such as 5% to 10% triethylamine or ethylene diamine solutions, or solutions of other strong bases, aqueous solutions of the respective salts of the new compounds of Formula I, wherein $R_2$ is a cation, are obtained.

It was, furthermore, found that a phosphate buffer solution of the pH of 8.0 also increases the solubility of the new compounds in water.

Solutions of such salts of the 2,3,1-diazaborine compounds of Formula I and such salts are prepared as described in the following examples:

EXAMPLE 57

47.68 g. of 1-hydroxy-2-[2′-chloro-4′-(γ-carboxy propylene carboxamido) phenyl sulfonyl] benzo-2,3,1-diazaborine are suspended in 400 cc. of water. 99 cc. of a 2 N sodium hydroxide solution are added thereto. The mixture is stirred at room temperature until an almost clear solution is obtained. The pH-value of said filtered solution is between 7.0 and 7.2. The solution is lyophilized and the resulting product is comminuted to yield a white powder which, on heating, slowly decomposes between 200° C. and 220° C. Its water content corresponds to that of the trihydrate of the disodium salt of 1-hydroxy-2-[2′-chloro-4′-(γ-carboxy propylene carboxamido) phenyl sulfonyl]benzo-2,3,1-diazaborine.

EXAMPLE 58

33.55 g. of 1-hydroxy-2-(2′-chloro-4′-amino phenyl sulfonyl) benzo - 2,3,1 - diazaborine obtained according to Example 27 are dissolved in 200 cc. of 0.5 N sodium hydroxide solution at about 30–35° C. while stirring. The solution is filtered and lyophilized. The residue is comminuted to a white powder which decomposes between 175° C. and 185° C. The resulting sodium salt is the trihydrate. Its water content is 13.2% while the calculated water content of the trihydrate is 13.25%.

EXAMPLE 59

75.5 g. of 1-hydroxy-2-(2′-chloro-4′-acetamino phenyl sulfonyl) benzo-2,3,1-diazaborine obtained according to Example 26, are suspended in 700 cc. of water. 200 cc. of N sodium hydroxide solution are added at room temperature thereto while stirring. An almost clear solution of the pH of 7.0–7.2 is obtained. Said solution is filtered and the filtrate is lyophilized. The residue is comminuted to a readily water soluble, white powder. Its water content is 11.5% corresponding to the water content of the trihydrate which is calculated to 11.9%. On acidifying the aqueous solution of said sodium salt, the compound of Example 26 is precipitated.

EXAMPLE 60

By dissolving 1-hydroxy-2-[2′-chloro-4′-(β-carboxy ethylene carboxamide) phenyl sulfonyl] benzo-2,3,1-diazaborine prepared according to Example 50, in the calculated amount of N sodium hydroxide solution and proceeding otherwise as described in Example 57, a solution of the disodium salt of the pH-value of 7.0–7.2 and, on lyophilizing said solution, the solid disodium salt is obtained.

EXAMPLE 61

By dissolving 1-hydroxy-2-(2′-fluoro-4′-amino phenyl sulfonyl) benzo-2,3,1-diazaborine prepared according to Example 46, in the calculated amount of N sodium hydroxide solution and proceeding otherwise as described in Example 57, a solution of the sodium salt of the pH-value of 7.0–7.2 and, on lyophilizing said solution, the solid sodium salt is obtained.

EXAMPLE 62

10 cc. of 0.5 N sodium hydroxide solution are added at room temperature to 1 g. of 1-hydroxy-2-(p-tolyl sulfonyl) benzo-2,3,1-diazaborine prepared according to Example 2. On stirring the mixture vigorously, said compounds dissolves. The resulting solution of its sodium salt may be diluted with water to the desired concentration for therapeutic use.

EXAMPLE 63

A solution of 1-hydroxy-2-(p-tolyl sulfonyl) benzo-2,3,1-diazaborine is also obtained on shaking a mixture of 1 g. of said compound and 6 cc. of a 5% aqueous ammonia solution.

EXAMPLE 64

5 cc. of a 10% aqueous solution of ethylene diamine are added at room temperature to 1 g. of 1-hydroxy-2-(p-ethyl mercapto phenyl sulfonyl) benzo-2,3,1-diazaborine prepared according to Example 10. On shaking the mixture, a clear solution is obtained which may be diluted with water for therapeutic use.

EXAMPLE 65

10 cc. of a 10% aqueous ammonia solution are added to 1 g. of 1-hydroxy-2-(p-methoxy phenyl sulfonyl) benzo-2,3,1-diazaborine prepared according to Example 19, yielding a solution of the ammonium salt of said compound.

EXAMPLE 66

1 g. of 1-hydroxy-2-(p-chloro phenyl sulfonyl) benzo-2,3,1-diazaborine prepared according to Example 4, and 0.5 cc. of triethylamine are added to 5 cc. of water. On shaking the mixture a clear solution of the respective salt is obtained.

EXAMPLE 67

A mixture of 20 mg. of 1-hydroxy-2-(p-tolyl sulfonyl) benzo-2,3,1-diazaborine and 20 cc. of a phosphate buffer solution of the pH of 8.0 is shaken to give a clear solution.

o-Formyl phenyl boric acid used as the one reactant in the preceding examples is prepared as described for instance, in "J. Org. Chem." vol. 29, pages 2168–2172 (1964) and 2-formyl thienyl-3-boric acid as well as 3-formyl thienyl-4-boric acid are prepared as described, for instance, in "Acta Chimica Scandinavica" vol. 19, pages 1271–1285 (1965). 2-formyl-5-methyl phenyl boric acid used as the one reactant in Example 24 is obtained as follows:

EXAMPLE 68

76.5 g. of 2-bromo-4-methyl benzaldehyde obtained according to "Organic Synthesis" vol. 46, page 13, are mixed with 30 g. of ethylene glycol, 200 cc. of benzene, and 0.5 g. of p-toluene sulfonic acid. The mixture is boiled in a vessel provided with condenser and water trap for 8 hours. After the condensation reaction is completed, the resulting solution is shaken and extracted with sodium bicarbonate solution and with water. The washed benzene solution is dried over magnesium sulfate. The benzene is distilled off therefrom and the residue is distilled in a vacuum. The reaction product which is obtained in a yield of about 90% of the theoretical yield, has a boiling point of 114–116° C./0.1 mm. Hg.

140 cc. of a 2.5 N solution of butyl lithium in hexane are cooled to −70° C. A solution of 84.5 g. of said above prepared reaction product in 200 cc. of absolute ether are slowly added thereto while well stirring and keeping the reaction mixture in a nitrogen atmosphere. Ten minutes after the addition is completed, a solution of 44 g. of boric acid trimethyl ester in 400 cc. of absolute ether is admixed thereto. The reaction mixture is stirred at −70° C. for five more hours. Thereafter, the temperature is allowed slowly to increase to room temperature. After careful addition of 500 cc. of N-hydrochloric acid, stirring is continued at room temperature for one more hour. Thereafter, the reaction mixture is allowed to separate into an ethereal layer and an aqueous layer. The layers are separated from each other. The aqueous layer is extracted with ether. The combined ethereal extracts are shaken and extracted three times, each time with 200 cc. of N sodium carbonate solution. The aqueous sodium carbonate extracts are acidified by the addition of 2 N hydrochloric acid. After standing for some time, crystal of 2-formyl-5-methyl phenyl boric acid precipitate from the cooled solution. The crystals are recrystallized from water. Yield: 8.5 g. corresponding to 15% of the theoretical yield. Melting point: 148° C. (with decomposition).

Other o-formyl phenyl boric acids having additional substituents in the phenyl ring are obtained in a similar manner from the correspondingly substituted 2-halogeno benzaldehydes.

Subsequent nitration of the 1-hydroxy-2-sulfo-substituted benzo-2,3,1-diazaborines is carried out in an analogous manner as described, for instance, in "Journ, Am. Chem. Soc." vol. 88, pages 358–361 (1966), whereby the corresponding compounds which are substituted in their phenylene ring by the nitro group, are obtained.

As stated above, the new compounds of Formula I according to the present invention possess a high activity against gram-negative bacteria. They are considerably more effective than known antibacterial agents as is shown in the following Table II. Table IIa compares the activity, for instance, of the compound of Example 2, i.e. of 1-hydroxy-2-(p-tolyl sulfonyl) benzo-2,3,1-diazaborine against *Escherichia coli* and *Salmonella typhimurium* with that of ampicillin, 2-(p-amino benzene sulfonamido)-4,5-dimethyl oxazole, chloramphenicol, and tetracycline. In carrying out these tests, groups of 10 animals each were infected with said two gram-negative bacteria and the oral activity of the various active agents was determined as the curative dose at which 50% of the animals survived the infection ($DC_{50}$). The animals infected with *Escherichia coli* received only one oral dose immediately after the infection while the animals which were infected with *Salmonella typhimurium* were administered the same dose three times, i.e. immediately after the infection, 24 hours thereafter, and 48 hours thereafter.

Table IIb compares the activity of the compound of Example 58, i.e. of the sodium salt of 1-hydroxy-2-(2'-chloro-4'-amino phenyl sulfonyl) benzo-2,3,1-diazaborine against *Escherichia coli*, *Proteus mirabilis*, *Proteus vulgaris*, and *Proteus morgani* with that of ampicillin, tetracycline, kanamycin, and 2-(p-amino benzene sulfonamido)-4,5-dimethyl oxazole. The effective doses $DC_{50}$ are calculated for the 2,3,1-diazaborine compound itself, i.e. the effective agent, and not for its sodium salt.

TABLE IIa

| Active compound | $DC_{50}$ in mg./kg. of mouse | |
|---|---|---|
| | E. coli | S. typhimurium |
| Compound of Example 2 | 30 | 40 |
| Ampicillin | 90 | 76 |
| 2-(p-amino benzene sulfonamido)4,5-dimethyl oxazole | 141 | 1,600 |
| Chloramphenicol | 64 | 98 |
| Tetracycline | 233 | 318 |

It is evident that the compound of Example 2 according to the present invention has a very high activity which surpasses that of the highly effective chloramphenicol by mole than 100%.

TABLE IIb

| | $DC_{50}$ in mg./kg. of mouse | | | | | | | |
|---|---|---|---|---|---|---|---|---|
| | E. coli | | Proteus mirabil. | | Proteus vulgar | | Proteus morgani | |
| Active compound | Or. | Subc. | Or. | Subc. | Or. | Subc. | Or. | Subc. |
| Compound of Example 58 | 36 | 13.4 | 6.0 | 3.5 | 4.25 | 3.0 | 7.25 | 3.75 |
| Ampicillin | 90 | 65 | 16 | | >320 | 120 | >320 | >320 |
| Tetracycline | 233 | 16 | >160 | >160 | | | | |
| Kanamycin | | 14 | | 20 | | | | |
| 2-(p-amino benzene sulfonamido)4,5-dimethyl oxazole | 141 | | 40 | | | | | |

It is evident that the compound of Example 58 is many times more effective than ampicillin, tetracycline, kanamycin, and the sulfonamide compound on oral administration and has at least the activity of tetracycline and kanamycin against *Escherichia coli* on subcutaneous administration.

The following Table III shows the $DC_{50}$ of a number of compounds of Formula I according to the present invention in which Z represents o-phenylene and the substituents $R_1$ and $R_2$ are as given in said table, on administration to mice infected with *Escherichia coli*. The values given for the sodium salts ($R_2$=Na) are calculated for the sodium-free compounds ($R_2$=H). The compounds were administered orally or subcutaneously.

TABLE III

| Compound of Example | $R_1$ | $R_2$ | $DC_{50}$ in mg./20 g. of mouse Orally | Subcutaneously |
|---|---|---|---|---|
| 1 | phenyl | H | 0.5 | |
| 2 | 4-CH$_3$-phenyl | H | 0.6 | |
| 2 (Na-salt) | 4-CH$_3$-phenyl | Na | 0.57 | 0.18 |
| 9 | 2,4-(CH$_3$)$_2$-phenyl | H | 1.0 | |
| 25 | 4-NH$_2$-phenyl | H | 0.94 | |
| 25 (Na salt) | 4-NH$_2$-phenyl | Na | 0.9 | 0.35 |
| 29 | 3-CH$_3$-4-NH$_2$-phenyl | H | 0.8 | |
| 29 (Na salt) | 3-CH$_3$-4-NH$_2$-phenyl | Na | 0.9 | 0.4 |
| 26 | 3-Cl-4-NH—COCH$_3$-phenyl | H | 2.4 | |
| 57 | 3-Cl-4-NH—CO(CH$_2$)$_3$—COONa-phenyl | Na | 6.51 | 1.2 |
| 59 | 3-Cl-4-NH—COCH$_3$-phenyl | Na | 0.98 | 0.52 |
| 27 | 3-Cl-4-NH$_2$-phenyl | H | 3.3 | |
| 58 | 3-Cl-4-NH$_2$-phenyl | Na | 0.72 | 0.27 |
| 61 | 3-F-4-NH$_2$-phenyl | Na | 0.36 | 0.2 |
| 40 | 2,4-Cl$_2$-5-NH—COCH$_3$-phenyl | H | 3.0 | |
| 6 | thienyl | H | 0.5 | |
| 17 | 4-CH$_3$-thiazolyl | H | 0.4 | |

The following Table IV shows the $DC_{50}$ of such compounds on administration to mice infected with *Proteus vulgaris*.
TABLE IV
| Compound of Example | $R_1$ | $R_2$ | $DC_{50}$ in mg./20 g. of mouse Orally | Subcutaneously |
|---|---|---|---|---|
| 1 |  | H | 0.26 | |
| 2 | —CH₃ | H | 0.46 | |
| 2 (Na salt) | —CH₃ | Na | 0.5 | 0.27 |
| 11 |  (CH₃) | H | 0.4 | |
| 9 | —CH₃ (CH₃) | H | 0.37 | |
| 25 | —NH₂ | H | 0.52 | |
| 25 (Na salt) | —NH₂ | Na | 0.40 | 0.24 |
| 29 | —NH₂ (CH₃) | H | 0.1 | |
| 26 | —NH—COCH₃ (Cl) | H | 0.8 | |
| 59 | —NH—COCH₃ (Cl) | Na | 0.49 | 0.26 |
| 50 | —NH—CO(CH₂)₂COONa (Cl) | Na | 1.9 | 1.5 |
| 57 | —NH—CO—(CH₂)₃COONa (Cl) | Na | 0.6 | 0.25 |
| 27 | —NH₂ (Cl) | H | 0.46 | |
| 58 | —NH₂ (Cl) | Na | 0.12 | 0.07 |
| 46 | —NH₂ (F) | Na | 0.16 | 0.14 |
| 13 |  | H | 0.25 | |
| 6 |  | H | 0.6 | |
| 12 | 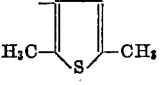 | H | 0.5 | |

TABLE IV—Continued

| Compound of Example | R₁ | R₂ | DC₅₀ in mg./20 g. of mouse | |
|---|---|---|---|---|
| | | | Orally | Subcutaneously |
| 14 | H₃C—[furan]—CH₃ | H | 0.5 | |
| 17 | [thiazole]—CH₃ | H | 0.3 | |

The following Table V shows the DC₅₀ of such compounds on administration to mice infected with *Salmonella typhimurium*:

TABLE V

| Compound of Example | R₁ | R₂ | DC₅₀ in mg./20 g. of mouse | |
|---|---|---|---|---|
| | | | Orally | Subcutaneously |
| 1 | [phenyl] | H | 0.25 | |
| 2 | [phenyl]—CH₃ | H | 0.92 | |
| 11 | [phenyl with CH₃] | H | 1.0 | |
| 9 | [phenyl with two CH₃] | H | 1.0 | |
| 25 | [phenyl]—NH₂ | H | 1.0 | |
| 26 | [phenyl with Cl]—NH—COCH₃ | H | 1.0 | |
| 27 | [phenyl with Cl]—NH₂ | H | 1.5 | |
| 58 | [phenyl with Cl]—NH₂ | Na | 0.19 | 0.145 |
| 6 | [thiophene] | H | 0.14 | |
| 17 | [thiazole]—CH₃ | H | 1.0 | |

The DC₅₀ in mice was also determined for the compound of Example 21, i.e. for 1-hydroxy-2-(p-tolyl sulfonyl) thieno-[2,3-e]-2,3,1-diazaborine. The DC₅₀-value of said compound, on oral administration of mice infected by *Escherichia coli*, is 0.4 mg./20 g. mouse, by *Proteus mirabilis* 0.4 mg./20 g. mouse, and by *Salmonella typhimurium* 4.0 mg./20 g. mouse.

These compounds of Formula I in which R₁ is a substituent of the following Formula Ia

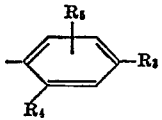

as mentioned hereinabove have not only a high antimicrobial activity but are also of low toxicity and, even on prolonged administration, do not produce side effects.

Another group of compounds which have proved to be of value are compounds of Formula I wherein R₁ is a substituent of the following Formula Ib

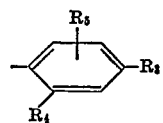

in which R₄ and R₅ may be hydrogen or the substituents given hereinabove on page 8 while R₃ is an amino group monoacylated by a di- or polycarboxylic acid. Such compounds are, for instance, compounds obtained as described hereinabove in Examples 50 to 53 by acylation of the respective amino compounds with acylating derivatives of di- or polycarboxylic acids such as oxalic acid, fumaric acid, adipic acid, glutaconic acid, citraconic acid, itaconic acid, malic acid, citric acid, tartaric acid, mucic acid, glutamic acid, dichloro succinic acid, phthalic acid, terephthalic acid, furan dicarboxylic acid, and others which are preferably reacted in the form of their anhydrides or mono-esters. Due to the presence of a free carboxyl group in their molecule these compounds are capable of forming readily water soluble alkali metal salts and especially sodium salts the aqueous solutions of which are of substantially neutral reaction.

Other 2,3,1-diazaborine compounds according to the Formula I which have a free or esterified carboxylic group or a carboxamido group attached to the amino group in the substituent $R_1$ are prepared, for instance, according to Examples 54 and 56 by reaction with chloro formic acid esters. It is, of course, also possible to condense o-formyl phenyl boric acid with a benzene sulfonic acid hydrazide substituted by a ureido group as described in Example 55.

Compounds of this type have a substituent $R_1$ of the following Formula Ic.

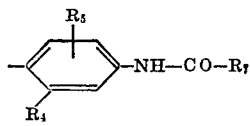

Ic wherein $R_7$ is a member selected from the group consisting of the carboxyl group, an alkyl carboxylic acid group, an aryl carboxylic acid group, or a heterocyclic carboxylic acid group, an esterified carboxyl group, an esterified alkyl carboxylic acid group, an esterified aryl carboxylic acid group, an esterified heterocyclic carboxylic acid group, the carboxamide group, an alkyl carboxamide group, an aryl carboxamide group, or a heterocyclic carboxamide group, alkoxy or phenoxy, or an amino group, while $R_4$ and $R_5$ are the same substituents as indicated hereinabove in col. 3, lines 50–55.

Compounds of this type with a free carboxyl group in the substituent $R_7$ are also capable of forming readily water soluble alkali metal salts.

Compounds of Formula I wherein the substituent $R_1$ contains a phenylene ring sharing two carbons atoms with the phenyl ring of said substituent may be prepared from the corresponding naphthalene sulfonic acid hydrazides. The substituent $R_1$ in such compounds corresponds to the Formula Id

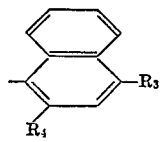

Id wherein $R_3$ and $R_4$ indicate the same members as mentioned hereinabove.

The following example serves to illustrate the preparation of a compound having a substituent $R_1$ similar to that of Formula Id but being a quinolyl ring in place of a naphthyl ring.

EXAMPLE 69

1.5 g. of o-formyl phenyl boric acid are intimately mixed with 2 g. of quinoline-8-sulfonic acid hydrazide. 10 cc. of hot ethanol are added thereto and the mixture is heated to boiling yielding a clear solution. After 3 hours the resulting precipitate is filtered off and is dissolved in hot dimethylformamide. Water addition to the solution causes reprecipitation of the reaction product which is filtered off by suction after cooling. 1.9 g. of 1-hydroxy-2-(quinolyl-8'-sulfonyl) benzo-2,3,1-diazaborine are obtained. Melting point: 254–256° C. with decomposition. Yield: 56% of the theoretical yield.

By proceeding in a similar manner 4-acetamido naphthalene-1-sulfonic acid hydrazide yields with o-formyl phenyl boric acid the corresponding naphthyl sulfonyl substituted benzo-2,3,1-diazaborine.

Compounds of Formula I wherein $R_2$ is the group

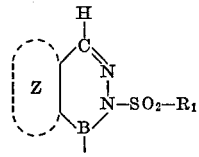

are obtainable by dimerization by heating in a vacuum to a temperature causing splitting off of water whereby the corresponding ethers are obtained.

Acute and chronic toxicity tests carried out with the compounds of Formula I show that there are differences in toxicity, which are especially marked, when the compounds are given for a prolonged period of time. For instance, the following values of the $DL_{50}$ (i.e. the dose following administration of which 50% of the test animals die) were determined when the compounds were orally administered once (acute toxicity).

TABLE VI

| Compound of Example | $DL_{50}$ in mg./kg. of— | |
|---|---|---|
| | Mouse | Rat |
| 2 | 520 | 1,200 |
| 9 | >2,000 | >2,000 |
| 26 | 4,000 | >5,000 |
| 27 | >5,000 | >5,000 |

The following Table VII gives the number of animals (in percent of the animals treated in the respective test) which died within four weeks on oral administration of the given daily doses on five days a week. Rats were used in these tests.

TABLE VII

| Compound of Example | Daily dose, mg./kg. of rat | Animals died, percent |
|---|---|---|
| 2 | 500 | 100 |
| 26 | 1,000 | 25 |
| 27 | 1,000 | 1 0 |

[1] This test was continued for nine more weeks. After the total time of thirteen weeks none of the animals has died.

The test results as given above in Tables II to VII show that the compounds of Formula I are valuable, therapeutically useful compounds. Of course, the compound of Example 2, for instance, due to the more pronounced toxicity on prolonged administration, is preferably used for topical application only or for oral administration for a short period of time. The compound of Example 27, in contrast thereto, may be administered topically, orally, or parenterally to humans or animals even for a prolonged period of time.

It may be mentioned that the $DL_{50}$ for the compound of Example 27, when administered intraperitoneally to mice and rats, is more than 5.000 mg./kg. of the animal's body weight.

As stated above, the new compounds according to the present invention represent valuable antimicrobial agents. They are preferably administered orally in the form of powders, tablets, or other solid shaped preparations. Such preparations are obtained, for instance, by diluting the active compounds with a solid pulverulent extending agent or pharmaceutical carrier to form an intimate mixture thereof. The components of said mixture are, for instance, intimately mixed in a ball mill or the like device to the desired degree of fineness, or the finely powdered solid carried is impregnated with a solution of said compound in water or in other suitable solvents, whereafter the water or solvent is removed by evaporation, preferably while milling.

Tablets, pills, and the like compressed and shaped preparations are prepared by using the commonly employed diluting agents, binders and the like additives, such as sugar, lactose, talc, starch, bolus alba, pectin; as binders, gelatin, gum arabic, methyl cellulose, yeast extract, agar, tragacanth; as lubricants, stearic acid, magnesium sterate, and others.

Lozenges, chewing gum, and the like compositions containing the 2,3,1-diazaborine compounds of Formula I according to the present invention have also proved useful. Since the new compounds are substantially tasteless, they may be administered in aqueous suspensions, for instance, incorporated in fruit juices, sirups, and the like.

The compounds according to the present invention are relatively difficultly soluble in water. Therefore, they are ordinarily used in aqueous or saline suspension when parenteral administration and especially intramuscular injection is required. Of course, as stated above, compounds according to the present invention which have a free carboxyl group in the substituent $R_1$ form alkali metal salts which are readily water soluble and can be administered in the form of their aqueous solutions.

The new compounds have proved to be especially valuable for topical administration as antimicrobial agents, for instance, in the form of salves, ointments, cremes, pastes, cerates, plasmas, liniments, dusting powders, emulsions, lotions, and the like topically applicable compositions. Incorporation of the compounds into adhesive plasters and tapes, especially those provided with pads such as the so-called band-aids and the like is also possible. They may be incorporated in soaps and other detergents, if desired, in combination with other active agents, for instance, with antibacterial agents which are effective against gram-positive bacteria. Rectal or vaginal administration, for instance, in the form of rectal and vaginal suppositories or urethral bougies whereby the vehicle may be cocoa butter (theobroma oil), glycerinated gelatin, mixtures of polyethylene glycols, or other conventionally used suppositories is also possible.

These and other pharmaceutical compositions are prepared in a manner known per se and with pharmaceutical incipients as they are conventionally used for this purpose. It may be mentioned that the new compounds and their pharmaceutical compositions have proved of value not only in human medicine but also in veterinary medicine.

They have also proved of value in the treatment of urological infections, such as infections of the kidneys and the urinary tract. For instance, the sodium salt of 1-hydroxy-2-(2'-chloro-4'-amino phenyl sulfonyl) benzo-2,3,1-diazoborine of Example 58 is highly effective in a daily dose between about 0.2 g. to about 1.0 g. in the treatment of urological infections with gram-negative bacteria, especially with Proteus strains.

As mentioned hereinabove, a number of the compounds according to the present invention, such as the compound of Example 50 and its disodium salt of Example 60 have proved to be highly effective diuretic agents.

It may be mentioned that not only the compounds which have a free carboxyl group in the substituent $R_1$ form readily water soluble alkali metal salts but that also a number of carboxyl group-free compounds, for instance, those of Example 27 can be converted into their readily water soluble alkali metal salts.

As stated hereinabove, noteworthy synergistic effects are produced by combining the compounds of Formula I with antibiotic agents. The following examples serve to illustrate such combination preparations without, however, being limited thereto.

EXAMPLE 70

Equal parts, by weight, of chloramphenicol and 1-hydroxy-2-(2'-chloro-4'-amino phenyl sulfonyl) benzo-2,3,1-diazaborine are intimately mixed. 250 mg. each of the resulting mixture are filled into gelatin capsules.

EXAMPLE 71

The procedure is the same as described in Example 70 whereby, in place of chloramphenicol, tetracycline hydrochloride is admixed to the 2,3,1-diazaborine compound.

EXAMPLE 71–A

A mixture of 5 g. of chloramphenicol and 5 g. of 1-hydroxy-2-(2'-chloro-4'-amino phenyl sulfonyl) benzo-2,3,1-diazaborine is prepared. Said mixture is incorporated into 90 g. of a molten suppository vehicle based on glycerol fatty acid esters such as theobroma oil. The mixture is stirred vigorously and is filled into suppository molds, each containing 2.5 g. thereof.

EXAMPLE 72

17.5 g. of propicillin potassium, i.e. phenoxy propyl penicillin potassium, 17.5 g. of 1-hydroxy-2-(2'-chloro-4'-amino phenyl sulfonyl) benzo-2,3,1 diazaborine, 25 g. of microcrystalline cellulose, 33 g. of spray-dried lactose, 6 g. of dried corn starch, and 1 g. of magnesium stearate are mixed. The mixture is compressed to biconvex dragée cores, which are sugar coated in the conventional manner. Dragées containing 35 mg. of the antibiotic compound and 35 mg. of the 2,3,1-diazaborine compound are obtained.

EXAMPLE 73

7 g. of propicillin potassium, 7 g. of 1-hydroxy-2-(2'-chloro-4'-amino phenyl sulfonyl) benzo-2,3,1-diazaborine, 1 g. sodium carboxy methyl cellulose, 0.2 g. of potassium sorbate, 0.05 g. of saccharin sodium, and 20 g. of sugar are intimately mixed with each other. On adding water to the mixture to yield 100 cc., a sirup containing 350 mg. of each active drug in 5 cc. is obtained.

EXAMPLE 74

A solution is prepared by stirring 10 cc. of 0.4 N sodium hydroxide solution and 1 g. of 1-hydroxy-2-(2'-chloro-4'-amino phenyl sulfonyl) benzo-2,3,1-diazaborine and heating the mixture. After cooling, 1.4 g. of chloramphenicol hemisuccinate sodium are added. The solution is filtered to yield a solution which can be used in therapy without further processing.

EXAMPLES 75 TO 80

The procedure is the same as described in Examples 69 to 74 but 1-hydroxy-2-(2'-chloro-4'-acetamino phenyl sulfonyl) benzo-2,3,1-diazaborine is used in place of 1-hydroxy-2-(2'-chloro-4'-amino phenyl sulfonyl) benzo-2,3,1-diazaborine.

EXAMPLES 81 TO 86

The procedure is the same as described in Examples 69 to 74 but 1-hydroxy-2-(2'-chloro-4'-acetamino phenyl sulfonyl) thieno-[2,3-e]-2,3,1-diazaborine is used in place of 1-hydroxy-2-(2'-chloro - 4' - amino phenyl sulfonyl) benzo-2,3-1-diazaborine.

EXAMPLES 87 TO 92

The procedure is the same as described in Examples 69 to 74 but 1-hydroxy-2-(2'-methyl-4'-amino phenyl sulfonyl) benzo-2,3,1-diazaborine is used in place of 1-hydroxy-2-(2'-chloro-4'-amino phenyl sulfonyl) benzo-2,3,1-diazaborine.

EXAMPLE 93

1.15 g. of 1-hydroxy-2-(2'-chloro-4'-amino phenyl sulfonyl) benzo-2,3,1-diazaborine are added at 30–35° C. to a solution of 1 g. of dihydrostreptomycin base in 20 cc. of water while stirring. The 2,3,1-diazaborine compound becomes dissolved within a short period of time, thereby forming a salt with dihydrostreptomycin. If desired, a salt of penicillin may be dissolved in the resulting solution.

EXAMPLE 94

The procedure is the same as described in Example 93 but 1.03 g. of 1-hydroxy-2-(p-tolyl sulfonyl) benzo-2,3,1-diazaborine are used in place of 1-hydroxy-2-(2'-chloro-4'-amino phenyl sulfonyl) benzo-2,3,1-diazaborine.

EXAMPLE 95

The procedure is the same as described in Example 93 but 1.23 g. of 1-hydroxy-2-(2'-methyl-4'-acetamino phenyl sulfonyl) benzo-2,3,1-diazaborine are used in place of 1-hydroxy-2-(2'-chloro-4'-amino phenyl sulfonyl) benzo-2,3,1-diazaborine.

EXAMPLES 96 TO 98

The procedure is the same as described in Examples 93 to 95, but a solution of 1 g. of streptomycin base in 20 cc. of water is used in place of dihydrostreptomycin base.

EXAMPLE 99

A solution of 1 g. of kanamycin base in 20 cc. of water is heated to 30–35° C. While stirring vigorously, 1.38 g. of 1-hydroxy-2-(2'-chloro - 4' - amino phenyl sulfonyl) benzo-2,3,1-diazaborine are added thereto. A solution of the respective kanamycin salt is obtained.

Of course, other antibiotic compounds than those used in the preceding examples may be added, whereby similar pharmaceutical compositions are obtained.

The following Tables VIII and IX represent results obtained with combinations of antibiotic compounds and the 2,3,1-diazaborine compounds of Formula I according to the present invention. The tests were carried out with 1-hydroxy-2-(2'-chloro-4'-amino phenyl sulfonyl) benzo-2,3,1-diazaborine (designated hereinafter as compound A) which was used in the form of its solution in potassium phosphate buffer solution of the pH 7.0, i.e. in the form of a solution of its potassium salt. The antibiotics given in the tables were added to said solution. The numerical values given in the tables are the amounts of the respective antibiotic in $\gamma$/cc. which, on addition to the phosphate buffer solution of the 2,3,1-diazaborine compound containing the amounts of said compounds as indicated in the heading of the tables, are capable of inhibiting the growth of the test microorganisms. These tests were carried out in a manner well known to the art as they are accepted as standard test methods.

TABLE VIII

Test microorganism: *Escherichia coli*
Minimum growth inhibiting dose of compound A: 40 $\gamma$/cc.

| Antibiotic agent | Solution containing compound A in $\gamma$/cc. | | | | | | | |
|---|---|---|---|---|---|---|---|---|
| | 0 | 1 | 2 | 4 | 6 | 8 | 10 | 20 |
| Chloramphenicol | 8 | 6 | 4 | | | 2 | | 1 |
| Penicillin G | 36 | | | | | | 12 | 6 |
| Ampicillin | 4 | | | | 2 | 1 | | |
| Tetracycline-HCl | 6 | | | 4 | 2 | 1 | | |
| Colistin | 1 | | 0.4 | | | 0.2 | 0.1 | |
| Spiramycin | >100 | 80 | 40 | 20 | 6 | 2 | | |
| Kanamycin | 20 | | | | | | 4 | 1 |

TABLE IX

Test microorganism: *Proteus mirabilis*
Minimum growth inhibiting dose of compound A: 60 $\gamma$/cc.

| Antibiotic agent | Solution containing compound A in $\gamma$/cc. | | | | | | | | |
|---|---|---|---|---|---|---|---|---|---|
| | 0 | 1 | 2 | 4 | 6 | 8 | 10 | 20 | 40 |
| Chloramphenicol | 40 | 20 | 10 | 8 | | | | | 1 |
| Penicillin G | 2.4 | | 1.2 | | | | | 0.6 | |
| Ampicillin | 6 | | | | 4 | | | 2 | |
| Tetracycline-HCla | 100 | | | 60 | | | | | 20 |
| Dihydrostreptomycin | 20 | | | | | | 10 | 2 | |

It is evident that, due to the synergistic effect of compound A, not only the more or less pronounced antibacterial activity of the antibiotic agents is increased, but also that the insufficient activity of some antibiotic agents which prevents their use in therapy—see in Table VII: Spiramycin, and Table VIII: Tetracycline—is increased to such an extent that such antibiotics inhibit growth of the test microorganisms in concentrations which can be used in therapy without danger and difficulty.

Said synergistic effect has also been observed in animal experiments. For instance, the curative dose $DC_{50}$, i.e. the dose in mg./kg. of body weight after the oral administration of which 50% of the test mice infected with *Escherichia coli* survived is for:

| | Mg./kg. |
|---|---|
| Compound A | 165 |
| Chloramphenicol | 64 |
| Ampicillin | 90 |

However, when orally administering mixtures of equal parts, by weight, of compound A with the antibiotic agents, the $DC_{50}$ is for:

a mixture of compound A and of chloramphenicol: 32 mg./kg. of each compound a mixture of compound A and of ampicillin: 60 mg./kg. of each compound.

It is evident that the required amounts of antibiotic agent are very considerably reduced by the addition of compound A. Corresponding results are achieved when mixing compound A and the antibiotic agents in other proportions.

The same synergistic effect is achieved by other 2,3,1-diazaborine compounds of Formula I as stated hereinabove. While, for instance, the minimum growth inhibiting concentration of 1-hydroxy-2-(2'-chloro-4'-acetamino phenyl sulfonyl) benzo-2,3,1-diazaborine, hereinafter designated as compound B, against *Escherichia coli* is 60 $\gamma$/cc. and that of ampicillin is 4 $\gamma$/cc., the growth of said microorganism is inhibited by a mixture of 8 $\gamma$/cc. of compound B and 2 $\gamma$/cc. of ampicillin or by a mixture of 20 $\gamma$/cc. of compound B and 1 $\gamma$/cc. of ampicillin.

The growth of *Proteus mirabilis* is inhibited by a concentration of 80 $\gamma$/cc. of compound B and by a concentration of 6 $\gamma$/cc. of ampicillin, the same inhibiting effects are achieved by the following mixtures of said active agents in the concentrations in $\gamma$/cc. as given hereinafter.

| Active agent | Mixture | | | | |
|---|---|---|---|---|---|
| | a | b | c | d | e |
| Compound A | 2 | 6 | 8 | 40 | 60 |
| Ampicillin | 4 | 2 | 0.8 | 0.6 | 0.4 |

These test results also prove the noteworthy and pronounced synergistic effect which antibiotic agents and the compounds of Formula I according to the present invention exert upon each other. This synergistic effect allows to reduce the amounts of antibiotic administered considerably so that undesired side effects are eliminated or at least considerably reduced.

Of course, many changes in the reactants, i.e. the formyl phenyl or thienyl boric acids and the sulfonic acid hydrazides, in the reaction conditions, temperature, and duration, in the solvents and diluents used, in the methods of working up and of purifying the reaction products, in the preparation of pharmaceutical compositions containing the new compounds according to the present invention, and the like may be made by those skilled in the art in accordance with the principles set forth herein and in the claims annexed hereto.

We claim:

1. 1-hydroxy-2-(p-tolyl sulfonyl) benzo-2,3,1 - diazaborine.

2. 1-hydroxy - 2 - (2',4' - dimethyl phenyl sulfonyl) benzo-2,3,1-diazaborine.

3. 1-hydroxy-2-(p-amino phenyl sulfonyl) benzo-2,3,1-diazaborine.

4. 1-hydroxy-2-[2'-chloro-4'-(B-carboxy ethylene carboxamido) phenyl sulfonyl] benzo-2,3,1-diazaborine or its sodium salt.

5. 1-hydroxy-2-[2'-chloro-4'-(γ-carboxy propylene carboxamido) phenyl sulfonyl] benzo-2,3,1-diazaborine or its sodium salt.

6. 1-hydroxy-2-(2'-chloro-4'-acetamino phenyl sulfonyl)benzo-2,3,1-diazaborine or its sodium salt.

7. 1-hydroxy-2-(2'-chloro - 4' - amino phenyl sulfonyl) benzo-2,3,1-diazaborine or its sodium salt.

8. 1-hydroxy-2-(2'-methyl-4'-amino phenyl sulfonyl) benzo-2,3,1-diazaborine.

9. A pharmaceutically acceptable salt of 1-hydroxy-2-(2'-chloro-4'-amino phenyl sulfonyl) benzo-2,3,1-diazaborine.

10. A 2,3,1-diazaborine compound of the formula

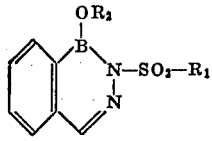

wherein $R_1$ is phenyl or phenyl-substituted by lower alkyl, halogen, trifluoromethyl, nitro, amino, lower alkanoylamino or lower carboxyalkanoylamino, wherein the alkyl and the alkanoyl of said alkanoylamino and carboxyalkanoylamino have 1 to 5 carbon atoms, and $R_2$ is hydrogen; or a pharmaceutically acceptable organic or inorganic salt thereof.

11. The 2,3,1-diazaborine of claim 10 of the formula

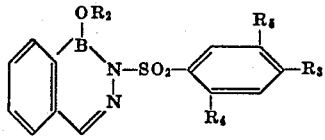

wherein $R_2$ is hydrogen, $R_3$ is hydrogen, lower alkyl, halogen, nitro, amino, lower alkanoylamino or lower carboxyalkanoylamino, wherein the alkyl and the alkanoyl of said alkanoylamino and carboxyalkanoylamino have 1 to 5 carbon atoms, $R_4$ is hydrogen, lower alkyl of 1 to 5 carbon atoms; halogen or trifluoromethyl, and $R_5$ is hydrogen or halogen or a pharmaceutically acceptable inorganic or organic salt thereof.

12. The diazaborine of claim 11 wherein the alkyl is methyl.

13. The diazaborine of claim 11 wherein the halogen is chlorine.

14. The diazaborine of claim 11 wherein both $R_4$ and $R_5$ are hydrogen and $R_3$ is methoxy.

15. The diazaborine of claim 11 wherein $R_4$ is chlorine.

16. The diazaborine of claim 11 wherein $R_4$ is $CF_3$ and $R_3$ is nitro.

17. The diazaborine of claim 11 wherein $R_4$ is $CF_3$ and $R_3$ is amino.

18. The diazaborine of claim 11 wherein $R_4$ is bromo and $R_3$ is acetamido.

19. The diazaborine of claim 11 wherein $R_4$ is bromo and $R_3$ is amino.

20. The diazaborine of claim 11 wherein $R_4$ is fluoro and $R_3$ is amino.

References Cited

UNITED STATES PATENTS 3,213,136  10/1965  Washburn et al. _____ 260—551
3,293,252  12/1966  Fried et al. _____ 260—268

OTHER REFERENCES

Dewar, et al., J.A.C.S. 86:433–6, February 1964.
Smith, Open-Chain Nitrogen Compounds, vol. II (Benjamin, N.Y., 1966), pp. 176, 181.

HENRY R. JILES, Primary Examiner
C. M. JAISLE, Assistant Examiner

U.S. Cl. X.R.

260—239.6, 256.5, 283, 287, 288, 294.8, 306.6 R, 306.8, 309, 309.2, 332.2 R, 332.3 P, 329 S, 347.2, 502.4, 545 R; 424—28, 181, 185